Jan. 17, 1967  E. A. MEYER  3,299,248
APPARATUS FOR ELECTRIC WELDING FASTENERS TO AUTOMOBILE BODIES
Filed May 15, 1963  2 Sheets-Sheet 1
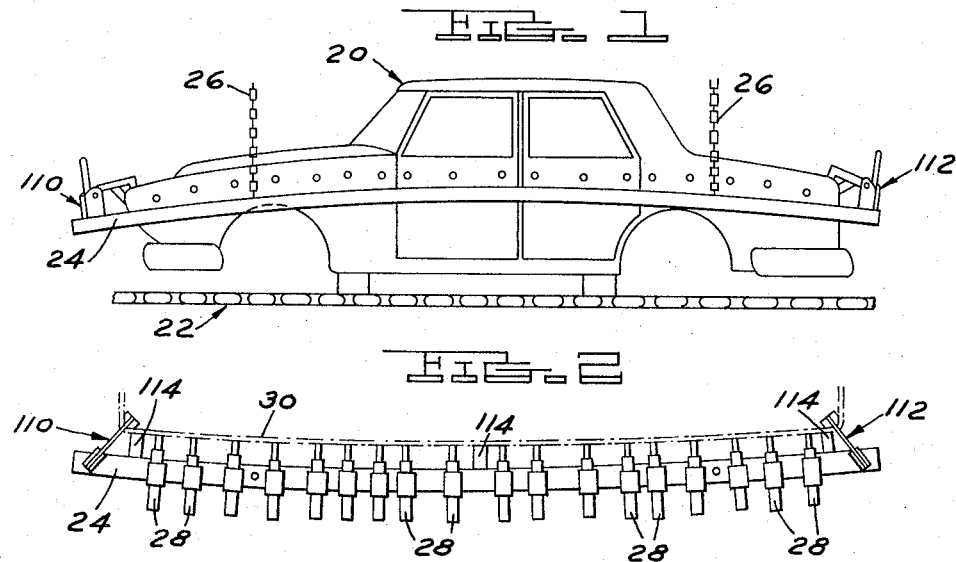
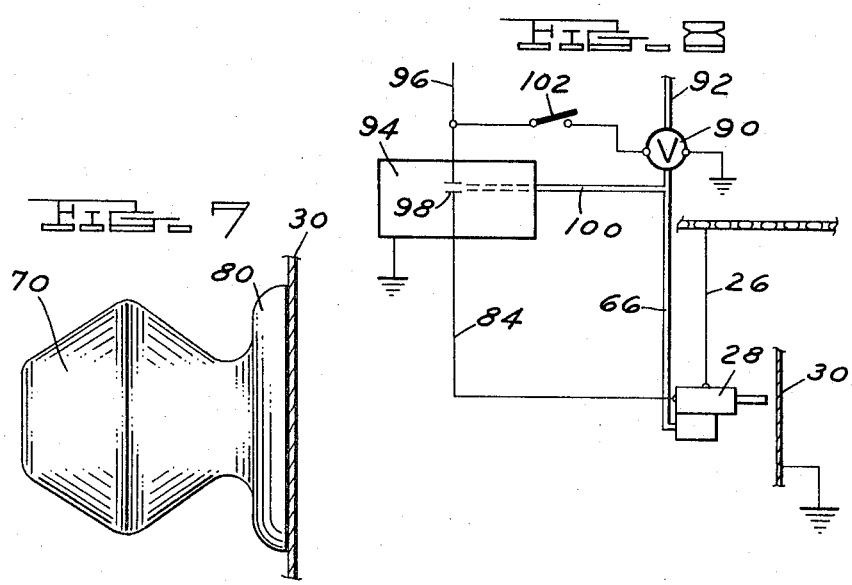
INVENTOR.
ENGELBERT A. MEYER
BY
*Burton & Parker*
ATTORNEYS

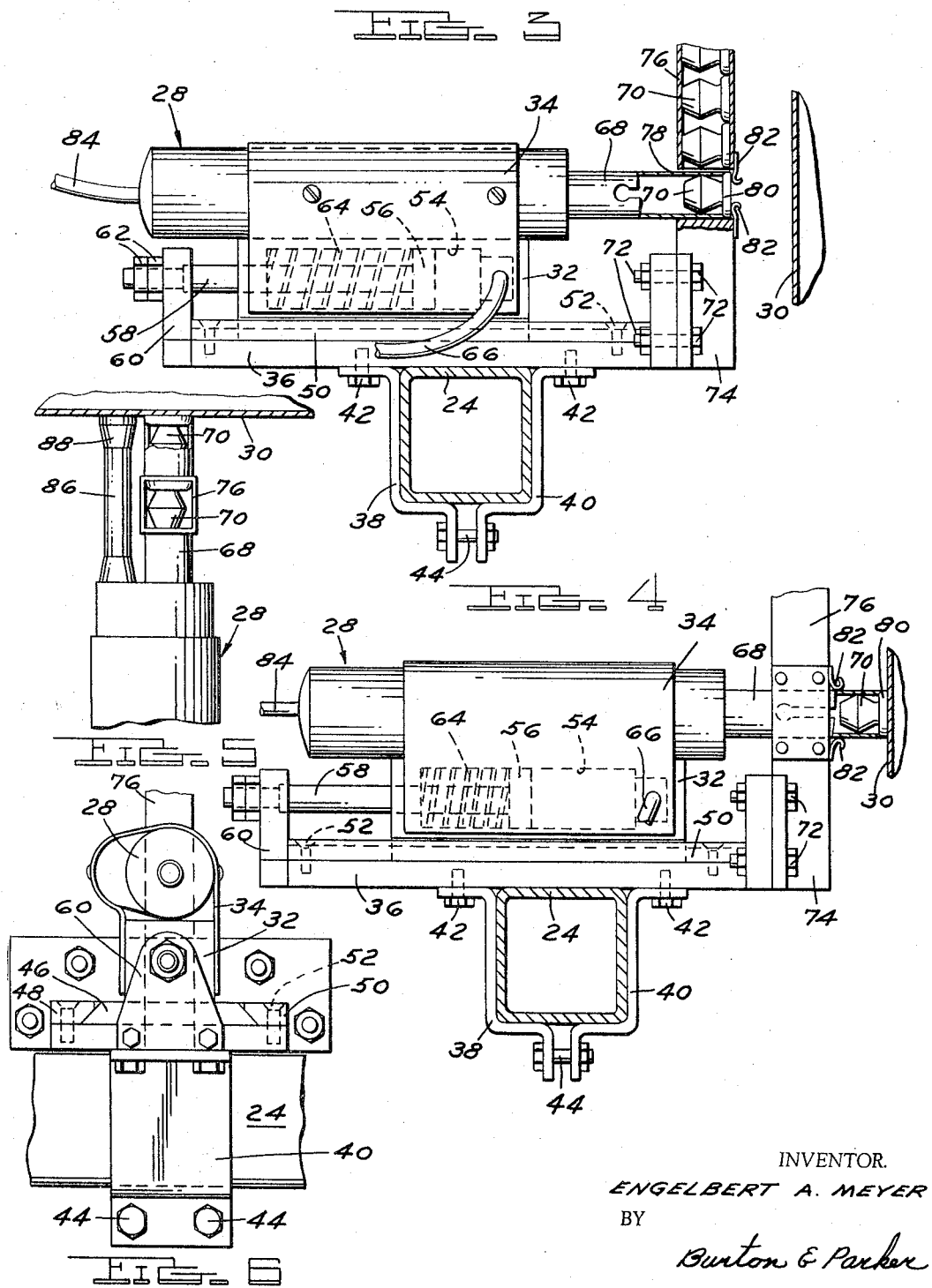

United States Patent Office 3,299,248
Patented Jan. 17, 1967

---

3,299,248
APPARATUS FOR ELECTRIC WELDING FASTENERS TO AUTOMOBILE BODIES
Engelbert A. Meyer, Union Lake, Mich., assignor to Chicago United Products Company, Inc., Detroit, Mich., a corporation of Michigan
Filed May 15, 1963, Ser. No. 280,531
2 Claims. (Cl. 219—98)

This invention relates to the finishing of automobile bodies and particularly to the securing of decorative trim strips to the exterior sheet metal surfaces of automobile bodies.

Primarily, it relates to a method of and apparatus for attaching fasteners to such vehicle bodies, which fasteners are utilized to secure the decorative pieces of stainless steel or the like the the exterior surfaces of the body walls.

Heretofore it has been common practice to provide automobile bodies with decorative trim strips or pieces which were secured to the body wall by screws, bolts or other attaching means. Commonly, apertures or holes were drilled or pierced through the wall of the automobile body wall, and the fastening elements projecting from the trim strips were inserted through such holes to attach the strip to the vehicle. It was usually necessary to provide some sort of sealers at such points to prevent leakage. The holes or apertures furthermore served as sources of rust, and once any rusting started it spread and gave rise to an unsightly appearing body wall and one which thereafter continued to deteriorate.

The instant invention contemplates the elimination of the holes through the body wall and consequently the elimination of the sealers commonly associated therewith. It is also designed to permit the securing of trim strips and the like to the body walls in a fast, simple and efficient manner. Moreover, it enables a complete finishing of the automobile body to provide a permanent and attractive finish which is substantially maintenance free.

According to the invention, male and female cooperating fastener elements are preferably employed, with the male element being attached to the surface of the body wall, and with the female element being mounted on the trim strip or other decorative piece.

An object of the invention is the provision of a method of attaching a plurality of fastener elements to sheet metal surfaces of automobile bodies without perforating the automobile body or marring the finish coating, and of locating the fastener elements in predetermined spaced relation on the body surfaces.

Another object is the provision of a method of the character hereinabove described which method embodies attaching a plurality of fastener elements to each of a succession of automobile bodies moving along a conveyor wherein the elements are attached to each body in a predetermined pattern for engagement with cooperating elements mounted on trim strips to be thereafter secured to said bodies.

A mertiorious feature is the provision of such a method wherein each fastener element is automatically attached to the sheet metal wall of the automobile body at a preselected point along the wall panel, with all the fastener elements being attached to the wall substantially simultaneously.

Another object is the provision of apparatus for simultaneously attaching, as by welding, a plurality of fastener elements to an automobile body surface in a predetermined pattern on the surface, whereby a decorative trim strip or the like may be thereafter easily and quickly secured to the body by engaging the fastener elements on the body surface with cooperating fastener elements carried by the trim strip.

A further object is the provision of apparatus of such a charcter as set forth above, which apparatus includes a fixture releasably securable to an automobile body in fixed relation with respect to a body wall to which fastener elements are to be attached, and a plurality of welding guns mounted on the fixture in spaced relation therealong juxtaposing said body surface and operable to weld fasteners to such surface in a predetermined pattern corresponding to the pattern of cooperating fastener elements on the trim strip or other decorative piece to be secured to the atuomobile body wall.

Another object is the provision of an apparatus of the above character containing control means operable to effect the welding operation automatically once the apparatus is in the desired fixed position with respect to the automobile body.

Other objects, advantages and meritorious features will more fully appear from the following specification, claims and accompanying drawings, wherein:

FIG. 1 is a side elevation of a conventional automobile body being carried along a conveyor and apparatus embodying the invention positioned along-side the conveyor;

FIG. 2 is a top plan schematic view of apparatus embodying the invention arranged with the welding guns in position to weld fastener elements to a wall of an automobile body;

FIG. 3 is a side view of one of such welding guns showing the gun in one position of movement toward the surface of the automobile body;

FIG. 4 is a view similar to FIG. 3 showing the gun in welding position;

FIG. 5 is a partial plan view of the forward position of the welding gun shown in FIGS. 3 and 4;

FIG. 6 is a rear view of the welding gun of FIGS. 3 and 4;

FIG. 7 is a side view of a male fastener element attached to a wall surface of an automobile body; and FIG. 8 is a schematic representation of apparatus embodying the invention showing the control circuitry therefor.

Referring first to FIG 1, there is shown a conventional automobile body 20 supported upon a conveyor mechanism 22 along which the bodies are carried for finishing, as is common practice in the automotive industry. Supported adjacent the conveyor 22 is a support member or fixture 24 which may be suspended as by chains 26 from an overhead trolley or the like (not shown) for movement toward and away form the body 20, and also for movement parallel with the conveyor 22, the purpose for which will be more fully apparent as the description proceeds.

As shown in FIG. 2, a plurality of welding guns 28 are mounted on the member 24 with the longitudinal axes of the guns extending generally transversely of the member, and with their forward or welding ends juxtaposing the surface of a wall 30 of the automobile body. The welding guns themselves are of conventional construction and specifically form no part of the instant invention.

Each of the welding guns 28 is independently mounted on the fixture 24 for shiftable movement toward and away from the body panel 30 of the automobile body. Referring to FIGS 3–6, such may be accomplished by mounting each gun 28 on a block 32 having a band 34 of sheet metal or the like secured thereto and embracing the gun body to hold it in position on the block. A bed plate 36 is secured to the support member 24 by clamping means comprising two arms 38 and 40 bolted as at 42 to the plate and connected together by means of a nut and bolt 44. Loosening of nut and bolt 44 permits the plate 38 and the gun 28 to be repositioned along the support member 24, and tightening of the nut and bolt clamps the arms 38 and 40 about member 24, locking the gun in position.

The block 32 is rigidly secured to a trapezoidally shaped slide 46, which is supported for movement on plate 36 between two gibs or ways 48 and 50 secured to the plate as by screws 52 (see FIG. 6). Block 32 defines a fluid pressure cylinder 54 having a piston 56 therein connected to a projecting piston rod 58. The piston rod 58 extends through an end plate 60 upstanding from bed plate 36, and is held against movement by lock nuts 62. A coil spring 64 in the cylinder 54 acts against piston 56 to bias the block 32 and gun 28 toward the end plate 60. As the piston 56 is held stationary by rod 58, pressurization of cylinder 54 through line 66 shifts the gun 28 and block 32 to the right in FIGS. 3 and 4, guided by slide 46 in the ways 48 and 50. Upon depressurization of cylinder 54, spring 64 returns the block and gun back to the left as seen in FIGS. 3 and 4.

The forward end of the welding gun 28 exhibits a fastener retainer or collet 68 adapted to releasably hold a male fastener element 70, as shown in FIGS. 3 and 4. Secured as by bolts 72 or the like to bed plate 36 is a block 74 having a chute 76 upstanding therefrom. The chute 76 is of a configuration, in this instance rectangular, to accommodate a stack of the male fasteners 70 as shown in FIG. 3. Opposite sides of the chute 76 are open at the lower end thereof as at 78 to admit the collet 68 to the welding gun 28. With the gun 28 in retracted position, collet 68 is retracted from chute 76, permitting a fastener 70 to drop down to the bottom of the chute in alignment with the collect. As the welding gun moves forward, collet 68 moves too, embracing fastener 70 until the forward end of the collet abuts the base 80 of the fastener. Yieldable spring clips 82 fastened to chute 76 are provided to keep the fastener from falling out of the chute as the collet moves forward to the position shown in FIG. 3, wherein the fastener is shown positioned in the collet ready to be carried thereby toward a sheet metal surface 30 of the automobile body.

As shown in FIG. 4, the gun continues forward until the base 80 of the fastener 70 abuts the body panel 30, at which point the parts are in position to be welded. Welding current is then supplied to the gun 28 through line 84 to effect the weld. The electric circuit is completed through the gun 28 to the fastener 70 and the metal panel 30, which is grounded to complete the circuit. A stop member 86 is provided projecting from the forward end of the welding gun 28 and having an insulated end portion 88 abutting the body wall 30 when the gun is shifted disposing the fastener 70 contacting wall 30, thus serving to position the gun 28 during the welding of the fastener to the plate. As the gun chuck or collet 68 shifts slightly with respect to the gun body during each welding cycle to strike an arc between the two parts to be welded, stop member 86 prevents movement of the gun 28 during such time.

FIG. 8 shows schematically a circuit for controlling the operation of the welding guns 28. Only one gun is shown for simplicity of representation. Pressure air or other fluid from a suitable source (not shown) is fed to valve 90 through line 92, which valve is preferably of the solenoid operated type. The valve outlet is connected to line 66 leading to cylinder 54 on the gun assembly 28. Opening of valve 90 pressurizes cylinder 54, shifting the welding gun toward body wall 30. Electric power is fed from a suitable source (not shown) to a master controller 94 through line 96, and from the control through line 84 to the welding guns 28. Control 94 includes a transformer and other electrical connections usually associated with portable welding guns, and need not be described in detail. However, it also includes a pressure operated switch 98 coupled to the air supply through branch air line 100. The fluid pressure necessary to actuate switch 98 is greater than normal pressure fed through line 66 to shift gun 28.

As the gun is shifted disposing fastener 70 and stop 86 against body wall 30, further movement of the gun is prevented, and pressure will build up in cylinder 54 (see FIG. 4) and in line 66. This will cause an increase in pressure through line 100 against switch 98, actuating the switch and completing the circuit through line 84, furnishing welding current to the gun 28. Main switch 102 is provided to energize the solenoid valve 90 and initiate the cycle. Thus closure of switch 102 opens valve 90, shifting the gun 28, and when stop 86 and fastener 70 abut panel 30, the pressure build-up in line 100 closes switch 98, delivering welding current to the gun to start the welding cycle. Opening of switch 102 exhausts valve 90, depressurizing lines 66 and 100, retracting the gun 28 from the panel 30 and opening switch 98 to interrupt the flow of welding current. Switch 102 may be a time delay control switch of conventional construction which will reopen after a predetermined time period. While the above description contemplates the control of only one welding gun, it will be apparent to one skilled in the art that the controller 94 can be connected to control a plurality of welding guns simultaneously, it only being necessary to incorporate therein a pressure switch such as 98 for each gun, all of which would have to be closed by fluid pressure before current is delivered to the guns.

As an automobile body 20 on conveyor 22 enters the station at which fixture 24 is located, the fixture may be clamped to the body by means of suitable clamps 110 and 112, as shown in FIGS. 1 and 2. Projecting from fixture 24 are locating blocks 114 which engage the body panel 30 to space the fixture in correct relation to the surface to which the fasteners are to be welded. Securement of the fixture 24 to the body 20 might be accomplished in different ways, as by providing locating blocks 114 containing electromagnets which are energized as the fixture is located in proper position relative to the body surfaces 30. The critical thing is that the fixture 24 be positioned and held in a predetermined location so that the fasteners will be attached to the body wall at the desired points, and the clamps 110 and 112 and blocks 114 are shown as one means of accomplishing this.

As the body 20 continues its travel along conveyor 22, the fixture 24 moves therewith, being suspended from a suitable overhead trolley or the like (not shown). With the fixture 24 fixed in position, main switch 102 (FIG. 8) is closed, opening valve 90 and pressurizing the cylinders 54 on each welding gun 28, shifting the guns toward the body wall 30. When the stop members 86 and fasteners 70 abut the wall 30 (FIG. 5) pressure will build up in each line 100 actuating switches 98 to close the electrical circuit and energize the welding guns 28 substantially simultaneously. As body panel 30 is grounded, welding current will flow through guns 28, fasteners 70 and panel 30, welding the fasteners to the panel. Switch 102 will then be opened, exhausting valve 90 to depressurize lines 66 and 100, thereby opening switches 98 to interrupt the welding current and allowing the guns 28 to retract from body wall 30 under the bias of the springs 64.

Each welding gun 28 is of generally conventional construction, with the fastener retainer or collet 68 being shiftable relative to the gun body. When the gun 28 is energized, the retainer 68 first retracts slightly, shifting fastener 70 away from body wall 30 to strike an arc therebetween, melting the two surfaces to be welded together. Then the retainer 68 advances, plunging the base 80 of fastener 70 into the molten pool of metal on wall 30 to complete the weld. During this welding cycle, the stop member 86 retains the body of welding gun 28 in fixed spaced relation with the body wall 30.

Once the welding operation has been completed, and the welding guns 28 have been retracted from body wall 30, the fixture 24 is disconnected from the automobile body 20 as by releasing the clamps 110 and 112, and the apparatus is returned to its original station adjacent conveyor 22 to await the arrival of the next automobile body moving along the conveyor. The fixture is then affixed to the next body 20 and the above steps repeated for that body.

It is common practice in the automobile industry to provide different body styles of the same make of automobile with different decorative trim strips and the like. These bodies of various styles may be moved along the same conveyor, and it is therefore necessary to attach the fasteners to the body walls in different locations to accommodate the various trim strips. Thus a separate apparatus for each particular body style may be provided adjacent the conveyor, with each including a fixture 24 having welding guns 28 mounted thereon in a particular pattern for a particular body style. In addition, it will be obvious to one skilled in the art that more than one welding assembly may be provided for each body style, enabling the attachment of fasteners to all the body surfaces of an automobile body. For example, separate fixtures with welding guns thereon might be provided for each side of the automobile body, and additional units for the hood and trunk. Thus the invention is not limited to attaching fasteners to the vertical side walls of the bodies, as shown in the drawings.

What is claimed is:

1. A self-loading welding gun assembly for welding successive components to a metal surface comprising, in combination: a support having means providing a component transfer chamber for receiving successive components from a source thereof, a source of components connected to said chamber for successively delivering components thereto, electrode means mounted on the support to hold each successive component in a welding position spaced forwardly of said chamber, said electrode means extending through said transfer chamber and shiftable therein to load successive components on the electrode means and position each in the aforesaid welding position, double acting motive means on the support connected to said electrode means for shifting the same relative to the chamber as aforesaid, means on the support connected to said electrode means and operable to momentarily retract the same rearwardly to strike an arc between a component carried thereby and a metal surface to which the component is to be welded and plunge the component through the arc against such metal surface, a source of welding current connected to the electrode means, and a control system connected to said source of welding current and to said means for retracting the electrode means and to said double acting motive means for synchronizing and controlling operation thereof and including a switch for initiating operation of each welding cycle.

2. In a welding system utilizing a plurality of stud welding means each having a collet for welding a headed fastener to an automobile panel with the head of the fastener spaced therefrom, the headed fastener being of a size such that it is completely housed and concealed by a trim piece mounted thereon wherein the improvement comprises supporting means for supporting the stud welding means in a predetermined pattern with respect to the panel to weld the headed fasteners in such pattern to the panel, means for removably connecting said supporting means to the panel, means for delivering and interconnecting a fastener in the collet of each welding means, moving means for advancing and retracting each collet independently with respect to the automobile panel, sensing means for each stud welding means and responsive to contact of its respective fastener with the automobile panel during advancing movement to enable initiation of the normal welding operation, said sensing means being constructed and arranged to produce a sound welding orientation of its respective fastener with its respective predetermined portion of the automobile panel.

References Cited by the Examiner
UNITED STATES PATENTS

| | | | |
|---|---|---|---|
| 1,238,206 | 8/1917 | Shuler | 219—107 X |
| 1,680,233 | 8/1928 | Townsend | 219—87 |
| 1,960,042 | 5/1934 | Andrus | 219—107 X |
| 2,788,434 | 4/1957 | Eaton | 219—99 |
| 3,153,468 | 10/1964 | Sweeney | 52—718 |

ANTHONY BARTIS, *Primary Examiner.*

RICHARD M. WOOD, *Examiner.*

R. F. STAUBLY, *Assistant Examiner.*